US008077775B2

(12) United States Patent
He

(10) Patent No.: US 8,077,775 B2
(45) Date of Patent: Dec. 13, 2011

(54) SYSTEM AND METHOD OF ADAPTIVE RATE CONTROL FOR A VIDEO ENCODER

(75) Inventor: Zhongli He, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 1615 days.

(21) Appl. No.: 11/383,119

(22) Filed: May 12, 2006

(65) Prior Publication Data
US 2007/0263720 A1 Nov. 15, 2007

(51) Int. Cl.
H04N 7/12 (2006.01)
H04N 11/02 (2006.01)
H04N 11/04 (2006.01)
H04B 1/66 (2006.01)

(52) U.S. Cl. .................................. 375/240.03
(58) Field of Classification Search .......................... None
See application file for complete search history.

(56) References Cited

U.S. PATENT DOCUMENTS

| | | | |
|---|---|---|---|
| 5,231,484 A | 7/1993 | Gonzalets et al. | |
| 5,270,813 A | 12/1993 | Puri et al. | |
| 5,414,469 A | 5/1995 | Gonzalets et al. | |
| 5,555,244 A | 9/1996 | Gupta et al. | |
| 5,565,920 A | 10/1996 | Lee et al. | |
| 5,673,265 A | 9/1997 | Gupta et al. | |
| 5,740,176 A | 4/1998 | Gupta et al. | |
| 5,799,017 A | 8/1998 | Gupta et al. | |
| 5,864,542 A | 1/1999 | Gupta et al. | |
| 6,115,689 A | 9/2000 | Malvar | |
| 6,160,846 A | 12/2000 | Chiang et al. | |
| 6,192,154 B1 | 2/2001 | Rajagopalan et al. | |
| 6,208,688 B1 | 3/2001 | Seo et al. | |
| 6,212,232 B1 | 4/2001 | Reed et al. | |
| 6,215,820 B1 | 4/2001 | Bagni et al. | |
| 6,222,881 B1* | 4/2001 | Walker | 375/240.03 |
| 6,272,151 B1 | 8/2001 | Gupta et al. | |
| 6,292,512 B1 | 9/2001 | Radha et al. | |

(Continued)

FOREIGN PATENT DOCUMENTS
EP  0 736 843 A2  10/1996
(Continued)

OTHER PUBLICATIONS

Reichel et al. "Joint Scalable Video Model JSVM-5." 18th Meeting: Bangkok, Thailand, Jan. 14-20, 2006. pp. 1-43.

(Continued)

Primary Examiner — Nhon Diep
(74) Attorney, Agent, or Firm — Gary R. Stanford

(57) ABSTRACT

A method of adaptively adjusting a QP of a video encoder to control output bit rate including estimating the QP based on a complexity of a previous frame and encoding bit rate information of a current frame to provide an estimated QP, determining a threshold value based on a video quality factor, a target bit rate and a complexity of a previous interval of the current frame or the same interval of the previous frame, and if the estimated QP is greater than the threshold value, adaptively adjusting the estimated QP using the threshold value, the target bit rate and the complexity of the previous interval. The method may include adaptively limiting a change of the QP between frame intervals based on a difference between the QP and the threshold value. Complexity information may be based on an average of minimum SAD values.

20 Claims, 4 Drawing Sheets

U.S. PATENT DOCUMENTS

| | | |
|---|---|---|
| 6,343,098 B1 | 1/2002 | Boyce |
| 6,351,491 B1 | 2/2002 | Lee et al. |
| 6,366,704 B1 | 4/2002 | Ribas-Corbera et al. |
| 6,532,263 B2 | 3/2003 | Radha et al. |
| 6,539,124 B2 * | 3/2003 | Sethuraman et al. .......... 382/251 |
| 6,603,883 B1 | 8/2003 | Hamanaka |
| 6,823,008 B2 | 11/2004 | Morel |
| 6,836,512 B2 | 12/2004 | Van Der Schaar et al. |
| 2002/0021754 A1 | 2/2002 | Pian et al. |
| 2002/0021756 A1 | 2/2002 | Jayant et al. |
| 2002/0122482 A1 | 9/2002 | Kim et al. |
| 2003/0072364 A1 | 4/2003 | Kim et al. |
| 2003/0123539 A1 | 7/2003 | Kim et al. |
| 2003/0152151 A1 | 8/2003 | Hsieh et al. |
| 2003/0156644 A1 * | 8/2003 | Song et al. ................ 375/240.13 |
| 2003/0215011 A1 | 11/2003 | Wang et al. |
| 2004/0037357 A1 | 2/2004 | Bagni et al. |
| 2004/0057516 A1 | 3/2004 | Kim et al. |
| 2004/0146103 A1 | 7/2004 | Chang et al. |
| 2004/0179596 A1 * | 9/2004 | Song et al. ................ 375/240.03 |
| 2005/0036544 A1 | 2/2005 | Webb et al. |
| 2005/0058198 A1 | 3/2005 | Zhao et al. |
| 2005/0105615 A1 * | 5/2005 | El-Maleh et al. ......... 375/240.12 |
| 2005/0169370 A1 | 8/2005 | Lee |

FOREIGN PATENT DOCUMENTS

| | | |
|---|---|---|
| EP | 1 086 593 A1 | 12/1996 |
| EP | 0 857 394 A1 | 5/1997 |
| EP | 1 315 380 A2 | 5/2003 |
| WO | WO 02/096120 A1 | 11/2002 |
| WO | WO 2004/045218 A1 | 5/2004 |

OTHER PUBLICATIONS

Siwei Ma, Wen Gao, Geng Wu, and Yan Lu "Rate Control for JVT Video Coding Scheme with HRD Considerations" Institute of Computing Technology, Chines Academy of Science, Beijing.

Hung-Ju Lee, Tihao Chiang, and Ya-Qin Zhang "Scalable Rate Control for MPEG-4 Video", IEEE Transactions on Circuits and Systems for Video Technology, vol. 10, No. 6 Sep. 2000 pp. 878-894.

Yoon Kim, Jae-Young Pyun, Jae-Hwan Jeong, and Sung-Jea Ko "Real-Time Frame-Layer Rate Control for Low Bit Rate Video over the Internet" IEICE Trans. Commun., vol. E87-B, No. 3 Mar. 2004, pp. 598-604.

Yoon Kim, Jae-Young Pyun, Hye-Soo Kim, Sang-Hee Park and Sung-Jea Ko "Efficient Real-Time Frame Layer Rate Control Technique for Low Bit Rate Video over WLAN" 8 pgs.

Jordi Ribas-Corbera and Shwmin Lei "Rate Control in DCT Video Coding for Low-Delay Communications" IEEE Transactions on Circuits and Systems for Video Technology, vol. 9, No. 1, Feb. 1999, pp. 172-185.

Anthony Vetro, Huifang Sun and Yao Wang "MPEG-4 Rate Control for Multiple Video Objects" IEEE Transactions on Circuits and Systems for Video Technology, vol. 9, No. 1, Feb. 1999 pp. 186-199.

Jordi Ribas-Corbera and Shawmin Lei "Rate Control for Low-Delay Video Communications" Sharp Labs of America Study Group 16Portland, Jun. 24-27, 1997 pp. 1-27.

* cited by examiner ously invention, the H.264 may not be used.

SYSTEM AND METHOD OF ADAPTIVE RATE CONTROL FOR A VIDEO ENCODER

BACKGROUND OF THE INVENTION

1. Field of the Invention

The present invention relates in general to video encoding, and more specifically to a system and method of adaptive rate control for a video encoder.

2. Description of the Related Art

Video standards are continuously being improved or otherwise replaced to improve performance and quality for a variety of applications. For example, the Advanced Video Coding (AVC) standard, Part 10 of MPEG4 (Motion Picture Experts Group), otherwise known as H.264, includes advanced compression techniques that were developed to enable transmission of video signals at a lower bit rate or to enable improved video quality at a given transmission rate. The H.264 is used for exemplary embodiments of the present invention although it is understood that the present invention is not limited to H.264 and is applicable to other video standards. The newer standard outperforms video compression techniques of prior standards in order to support higher quality streaming video at lower bit rates and to enable internet-based video and wireless applications and the like. The standard defines the syntax of the encoded video bit stream along with a method of decoding the bit stream. Each video frame is subdivided into one or more slices and encoded at the macroblock (MB) level, where each MB is a 16×16 block of pixels. The size of each slice is arbitrary and may range between a single MB up to all of the MBs in the frame. Each frame is also subdivided according to a rate control interval, specified as a number of MBs per interval, where the rate control interval also ranges between a single MB up to all of the MBs in the frame. The slice size and interval size may be, but are not necessarily, the same.

The H.264 standard employs a transform process for encoding, such as the Discrete Cosine Transform (DCT) compression process. A quantization parameter (QP) is used by the encoder for quantizing the transform coefficients. Although prior video standards defined a linear relationship between QP and a corresponding quantization step size, H.264 specifies a logarithmic relationship. At higher values of QP, a relatively small change of QP results in a relatively large change in the quantization step size applied during the quantization process. The encoder uses a rate controller to control the bit rate of the compressed video stream provided at the output of the encoder. The rate control mechanism adjusts coding parameters, such as QP, frame rate, target bit rate, etc. to meet a given "bit budget" by dynamically allocating the bits at various levels, including group of pictures (GOP), picture or frame, interval or slice, and macroblock. A variable bit rate (VBR) encoder uses a fixed QP to provide a relatively constant visual quality, which is suitable for program stream applications such as VCD, DVD players, and the like. A constant bit rate (CBR) encoder adjusts QP to maintain a relatively constant bit rate (with variable visual quality), which is suitable for transport stream applications (e.g., two-way visual communications) with a relatively fixed or low-bandwidth channel.

Real-time visual communication requires that the compressed video data be transmitted through a communication channel at a specified constant bit rate in a low-delay, or a very low-delay mode. The rate control algorithm performs this task by dynamically adjusting encoder parameters, including QP, to achieve a given target bit rate. It has proved to be difficult to maintain coding efficiency, however, while also maintaining a constant bit rate in a real-time encoding application employing the conventional linear or quadratic prediction process used for predicting QP. For example, the conventional linear prediction method to adjust QP is to use the buffer status and other statistic coding information for coding the current MB, or interval. This conventional linear method for predicting QP works well for video with simple content or with relatively small motion content because the difference between the current QP and the previous QP (where the difference is referred to herein as "deltaQP") is sufficiently small. For video sequences with a significant amount of motion, however, deltaQP becomes unpredictable due to the inaccurate estimation of QP, which causes large fluctuations among the encoded intervals and which results in significantly reduced coding efficiency. The conventional predictive method is not accurate because it does not provide an adequate analytic expression between QP and the number of bits used for encoding. And the conventional prediction method causes QP to easily exceed the maximum value specified by the H.264 video coding standard, which results in a non-efficient and often uncontrollable rate-distortion process, such as oscillation of the visual quality between frames or slices.

One method to reduce the large and undesirable fluctuations is to simply cap or cramp the deltaQP within a small range. The relatively small cap, however, still causes the fluctuation problem because it ignores the amplitude of the deltaQP, and thus ignores the estimated QP. Ignoring the amplitude of deltaQP is more serious in the H.264 encoder when QP, which has a greater range (0-51) compared to prior standards, is relatively large, such as 40 or above. A large QP results in a much higher quantization step size due to the logarithmic relationship even in a small range, so that the resulting encoded picture quality is significantly depreciated. And the problem simply gets worse when the error is propagated and increased with subsequent frames. In addition, simply capping deltaQP within a fixed range (e.g. [−2, 2]) often causes QP to oscillate between fixed values, thereby degrading picture quality. For example, the value of QP often simply alternates between QP and QP+2.

In this manner, the conventional prediction for calculating QP resulted in a relatively wide range of QP when applied to newer video standards, such as the H.264 standard. It is desired to provide a system and method of adaptive rate control for a video encoder.

BRIEF DESCRIPTION OF THE DRAWINGS

The benefits, features, and advantages of the present invention will become better understood with regard to the following description, and accompanying drawings where.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Figure 1:
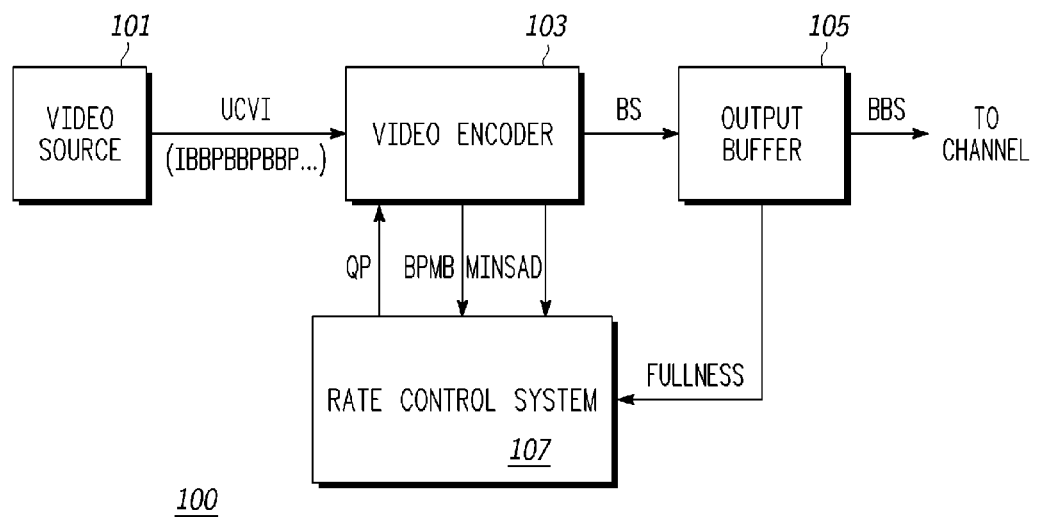
FIG. 1 is a block diagram of a video encoder system implemented according to an exemplary embodiment of the present invention.

FIG. 1 is a block diagram of a video encoder system 100 implemented according to an exemplary embodiment of the present invention. A video source 101 provides uncompressed video information (UCVI) to a video encoder 103, which encodes the UCVI and provides a compressed video bit stream (BS) at its output. The video encoder 103 is implemented according to H.264, where it is understood that the present invention is applicable to other video encoders implemented according to different standards including future standards yet to be developed. The UCVI is shown as a stream of MPEG frame types IBBPBBPBBP..., including I frames, B frames, P frames, etc., as understood by those skilled in the art. It is noted that the B frames might not be used for real-time, low delay applications since bidirectional prediction causes extra coding delay. Additional frame types are supported and the particular ordering of the video source information may be modified as understood by those skilled in the art. The bit stream BS is provided to an output buffer 105, which provides a buffered bit stream (BBS) for transmission via a channel. The relative fullness level of the output buffer 105 is indicated by a buffer fullness signal FULLNESS provided from the output buffer 105 to a rate control system 107. Although the bit stream BS may be provided to a storage device for later viewing or transmission, the video encoder system 100 is particularly configured for real-time visual communication in which the buffered bit stream BBS is transmitted via the channel at a specified constant bit rate with very low or minimal delay. The specified bit rate is referred to herein as a target bit rate (TBR), which may be adjusted from time to time by the rate control system 107 depending upon the characteristics of the channel. Typical target bit rates are 64 kilo-bits per second (kbps), 128 kbps, 256 kbps, and 384 kbps, although other bit rates are contemplated. The TBR may be adjusted up or down as the characteristics channel change over time. The video encoder 103 also operates at a target frame rate (TFR), such as 15 frames per second (fps) for quarter common intermediate format (QCIF) or a frame 30 fps for full CIF, etc.

Figure 2:
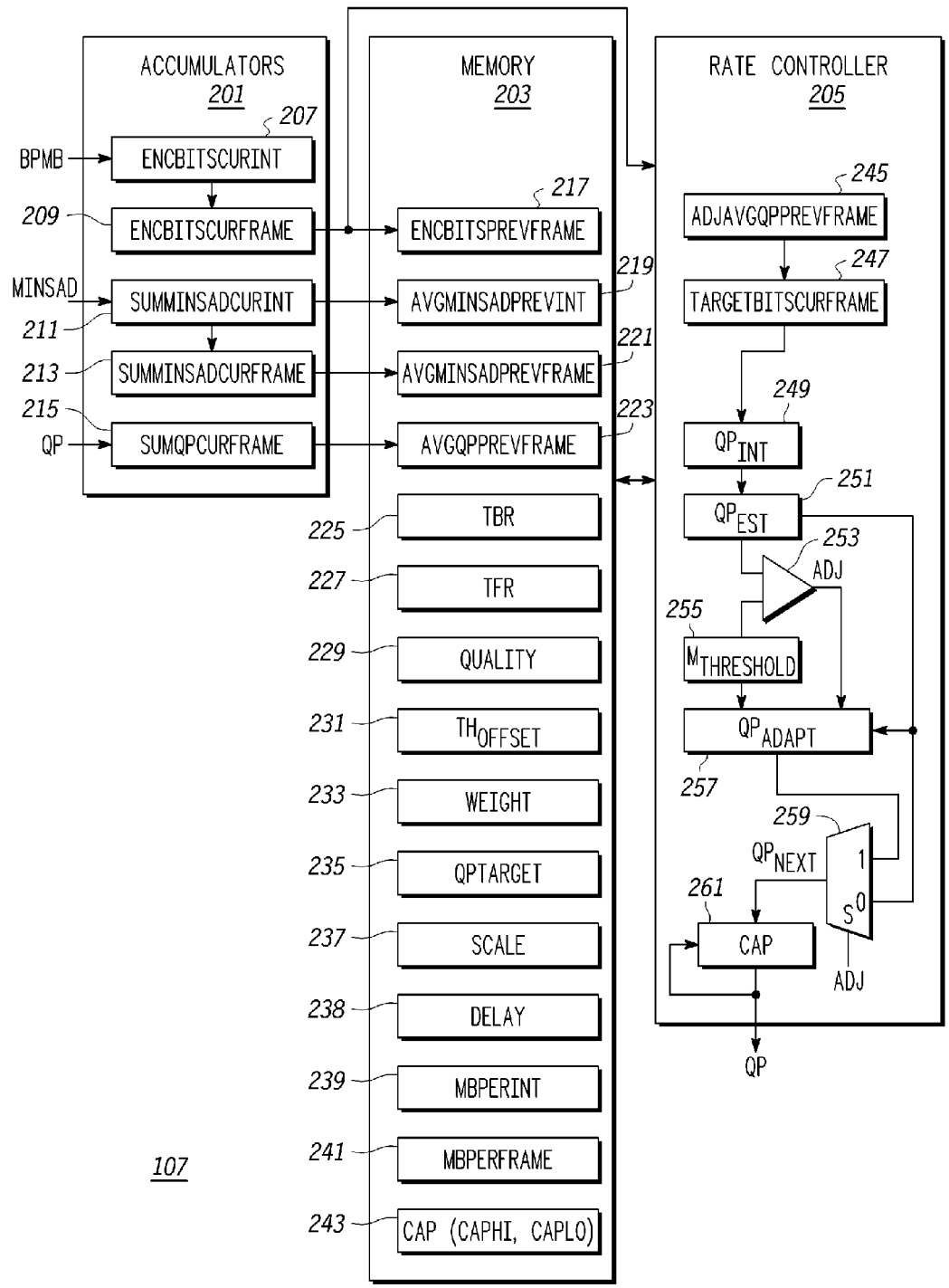
FIG. 2 is a block diagram of the rate control system of FIG. 1 implemented according to an exemplary embodiment of the present invention.

The rate control system 107 monitors and controls the video encoder 103 and the output buffer 105 to maintain the TBR and the TFR. The video encoder 103 performs quantization during the encoding process as understood by those skilled in the art, in which quantization is determined and controlled by the quantization parameter (QP). The larger the value of QP, the larger the quantization step size applied to the transform coefficients and thus the lower the visual quality of the encoded information. In the illustrated embodiment, the rate control system 107 provides and controls the value of QP provided to the video encoder 103 in an attempt to maintain the TBR of the BBS provided to the channel. The rate control system 107 operates according to a rate control interval, which is specified as a number of macroblocks per interval, stored as a value MBPERINT at a memory location 239 (FIG. 2). Each frame of input video is divided into a specified number of macroblocks (e.g., MBPERFRAME, stored at another memory location 241), and the MBPERINT is an arbitrary number that ranges between a single MB up to all of the MBs in the frame.

The rate control system 107 adjusts QP at the picture or frame level (i.e., for each frame), and at the interval level (i.e., for each interval of each current frame) to maintain the TBR. At the frame level, the rate control system 107 adaptively allocates bits for each frame based on buffer fullness and frame complexity, where frame complexity is indicated by the average QP in the previous frame and the mean absolute difference in the previous MB, interval and/or frame. In this manner, the rate control system 107 adaptively achieves a quality trade-off between picture quality and frame rate. At the interval level, the rate control system 107 uses a threshold concept to adjust a high QP obtained from linear prediction. The threshold value, or $M_{THRESHOLD}$, is dynamically adjusted by estimating the complexity of the current interval based on the average QP of the previous frame, the QP of the previous interval in the current frame, and/or the mean absolute difference in the current frame so far.

In the illustrated embodiment, the video encoder 103 encodes each macroblock one at a time and provides a number of encoded bits per macroblock, or BPMB. The BPMB value is the actual number of bits used to encode the current macroblock. The video encoder 103 also determines a minimum sum of absolute difference (MINSAD) value between the current frame and a previously encoded frame for each macroblock. As described further below, the BPMB and MINSAD values are accumulated and stored by the rate control system 107 and used to adjust QP at the frame level and at the interval level.

FIG. 2 is a block diagram of the rate control system 107 implemented according to an exemplary embodiment of the present invention. In the illustrated embodiment, the rate control system 107 includes several accumulators 201, a memory 203, and a rate controller 205. The particular rate control system 107 illustrated is exemplary only and may include fewer or additional components or elements in other embodiments. The accumulators 201 are used to accumulate particular sums for storage in the memory 203 and/or for use by the rate controller 205. The BPMB value is provided to a first accumulator 207, which accumulates the actual number of encoded bits in the current interval shown as a value ENCBITSCURINT. In operation, the accumulator 207 is initially cleared and when the first MB of the first interval is encoded, the first value of BPMB from the video encoder 103 is added to the contents of accumulator 207. When the second MB is encoded, the BPMB is updated and the new value is added to (or summed together with) the contents of the accumulator 207. In this manner, each new value of BPMB is added to the contents of the accumulator 207 so that the ENCBITSCURINT value represents a running total of the number of bits for encoding the current interval of the current frame being encoded. Various mechanisms are known that may be used for synchronizing the video encoder 103 with the contents of the any of the accumulators 201 including the accumulator 207. For example, the video encoder 103 may provide a clock signal or other synchronization signal indicating when the BPMB value is updated after each new MB is encoded. When the current interval is completed, the value stored in the accumulator 207 is transferred to another accumulator 209 and the accumulator 207 is cleared. In the illustrated embodiment, the memory 203 stores the number of MBs per interval as the MBPERINT value at the memory location 239, so that the rate control system 107 detects the completion of each interval and the start of the next.

The accumulator 209 is initially cleared at the beginning of each frame to be encoded. In the illustrated embodiment, the memory 203 stores the number of MBs per frame as the MBPERFRAME value at the memory location 241, so that the rate control system 107 detects the completion of each frame and the start of the next. After each interval is completed in the current frame, the accumulator 209 is updated with the contents of the accumulator 207. In this manner, the accumulator 209 maintains a running total of number of encoded bits in the current frame shown as a value ENCBITSCURFRAME. The ENCBITSCURFRAME value is provided directly to the rate controller 205. When the video encoder 103 completes the encoding process of the current frame, the contents of the accumulator 209 are stored as a value ENCBITSPREVFRAME at a memory location 217 within the memory 203, and the accumulator 209 is cleared to begin accumulating the number of encoded bits for the next frame as the new current frame.

In a similar manner as described above for the accumulator 207, an accumulator 211 is cleared prior to encoding each interval and the value of each new MINSAD for the current interval is added to the contents of the accumulator 211, shown as a value SUMMINSADCURINT. At the completion of each interval of the current frame, the SUMMINSADCURINT value in the accumulator 211 is used to derive an average minimum SAD value for the previous interval, shown as a value AVGMINSADPREVINT stored at a memory location 219 within the memory 203. In particular, the SUMMINSADCURINT value is first divided by the MBPERINT value (the number of MBs per interval), and the result is stored at memory location 219 as the AVGMINSADPREVINT value. Also, in a similar manner as for the accumulator 209, another accumulator 213 is initially cleared at the beginning of each frame and the SUMMINSADCURINT value is added to the contents of the accumulator 213 after the completion of each interval. In this manner, the accumulator 213 accumulates the sum of MINSAD values for the current frame shown as a value SUMMINSADCURFRAME. At the completion of each frame, the SUMMINSADCURFRAME value in the accumulator 213 is used to derive an average minimum SAD value for the previous frame, shown as a value AVGMINSADPREVFRAME stored at a memory location 221 within the memory 203. In particular, the SUMMINSADCURFRAME value is first divided by the MBPERFRAME value, and the result is stored at memory location 221 as the AVGMINSADPREVFRAME value. The accumulator 213 is then cleared to begin a new frame. In a similar manner, QP is updated for each interval and each new QP is summed into another accumulator 215 to update a sum of the QP values in the current frame, shown as a value SUMQPCURFRAME. At the end of encoding each frame, the SUMQPCURFRAME is divided by the total number of intervals for the frame and the result is stored as a value AVGQPPREVFRAME in a memory location 223 in the memory 203. The number of intervals is either directly determined or otherwise derived from the MBPERINT and MBPERFRAME values.

Several other values are stored in the memory 203. The TBR is stored at a location 225 and the TFR is stored at a location 227. A QUALITY factor is stored at a location 229, and represents a quality tradeoff between picture quality and the frame rate. Increasing the QUALITY factor increases the picture quality and decreases the frame rate, and vice-versa. In one embodiment, the QUALITY factor ranges between 0 and 30 with a default value of 20. A set of threshold offset values $TH_{OFFSET}$ are stored at a location 231 ranging between 5 and 10, and the chosen value of $TH_{OFFSET}$ is a function of the TBR and the TFR. In one embodiment, if the TBR is 64 kbps, then the $TH_{OFFSET}$ value is 7.5 for QCIF or less and otherwise 9.5; if the TBR is 256 kbps (but greater than 64 kbps), then the $TH_{OFFSET}$ value is 6.0 for QCIF or less and otherwise 8.0; and if the TBR is 384 kbps (but greater than 256 kbps), then the $TH_{OFFSET}$ value is 5.0 for QCIF or less and otherwise 7.5. Otherwise, the $TH_{OFFSET}$ value has a default value of 7.0. A set of WEIGHT factors are stored at a location 233, and the chosen WEIGHT factor is a function of TBR. The WEIGHT factor is used to scale down the AVGMINSADPREVINT value as described further below, and is selected as 1280 for TBR of 64 kbps or less, 1920 for TBR of 256 kbps or less, and 3072 otherwise. A set of QPTARGET factors ranging between 16 and 43 are stored at a location 235 within the memory 203, where and the selected QPTARGET factor is based on TBR. In the illustrated embodiment, TBR is divided by 8,000 and the result is used as an index of the QPTARGET factors [43, 16]. In this manner, the lower the TBR, the lower the index value and the higher the QPTARGET factor. A predetermined scale factor SCALE is stored at a location 237 within the memory 203, and are used to scale up or down a TARGETBITSCURFRAME value. In the illustrated embodiment, the SCALE factor is 0.5. A set of delay factors DELAY are stored at location 238 and range between 1 and 31 which represent how much delay a user can tolerate. A set of CAP ranges are stored at memory location 243 which are used to adaptively limit the amount of change of QP (deltaQP) as further described below. Each CAP range specifies a CAPHI value representing the maximum increase of QP and a CAPLO value representing the maximum decrease of QP.

Before encoding the next frame after encoding a previous frame, the rate controller 205 checks the buffer level via the FULLNESS signal to determine if the next frame should be skipped or not for low-delay applications. The FULLNESS signal has a value which is based on the ratio of the number of existing bits in the buffer and the buffer size. In one embodiment, FULLNESS=NUMBITS/BUFFSIZE, where NUMBITS is the actual number of bits stored in the output buffer 105 and BUFFSIZE the size of the output buffer 105, which is further determined by the DELAY factor. In one embodiment, the size of the output buffer 105 is determined by the DELAY factor for the given target bit and frame rates according to the relationship BUFFSIZE=1.5*DELAY*TBR/TFR. If FULLNESS is larger than or equal to "1", then the next frame is skipped until the value of FULLNESS is less than "1". Otherwise, the next frame is not skipped. If the DELAY factor is 1, then the encoder 103 introduces up to 1.5 frame delay (99 milliseconds (ms) for QCIF at 15 fps, and 49 ms for QCIF at 30 fps). The DELAY factor is typically set to 1 for low delay, 2-way video.

The rate controller 205 adaptively adjusts QP at the frame level and at the selected rate control interval level. The rate controller 205 includes a circuit 245 which calculates a first value ADJAVGQPPREVFRAME according to the following equation (1):

$$ADJAVGQPPREVFRAME = 0.5 * AVGQPPREVFRAME + \frac{1024 + AVGMINSADPREVFRAME}{256} \quad (1)$$

where AVGQPPREVFRAME and AVGMINSADPREVFRAME are both determined and stored at memory locations 223 and 221 as previously described. If the previous frame is an I frame, then the AVGQPPREVFRAME value is the default value used for the previous I frame, or $QP_{IDEFAULT}$, and a default value is used for AVGMINSADPREVFRAME (e.g., 1,500). The rate controller 205 includes a circuit 247 which calculates a second value TARGETBITSCURFRAME according to the following equation (2):

$$TARGETBITSCURFRAME = \frac{TBR}{TFR} * \left(1 + SCALE * LN\left(\frac{ADJAVGQPPREVFRAME}{QPTARGET}\right)\right) \quad (2)$$

where TBR, TFR and SCALE are stored at memory locations 225, 227 and 237, respectively, ADJAVGQPPREVFRAME was previously determined according to Equation (1), the QPTARGET factor is selected using TBR/8,000 as an index value as described above, and where "LN" is the natural logarithmic function. The circuit 247 then bounds TARGETBITSCURFRAME by the level of the buffer fullness, with a lower bound of 2*(TBR/TFR)*(1−FULLNESS) and an upper bound of (TBR/TFR)*(1.5−FULLNESS). If TARGETBITSCURFRAME is less than the lower bound, it is set to the lower bound. Otherwise, if TARGETBITSCURFRAME is larger than the upper bound, it is set to the upper bound. If the lower bound is larger than or equal to high bound (i.e., when FULLNESS<=0.5), then the upper bound is set to equal to the lower bound. The rate controller 205 includes a circuit 249 which uses the TARGETBITSCURFRAME value to determine an initial QP parameter $QP_{INIT}$ according to the following equation (3):

$$QP_{INIT} = AVGQPPREVFRAME * \left(0.5 + \frac{ENCBITSPREVFRAME}{2*TARGETBITSCURFRAME}\right) \quad (3)$$

where AVGQPPREVFRAME and ENCBITSPREVFRAME are found at memory locations 223 and 217, respectively.

Equation (2) for determining the TARGETBITSCURFRAME value is similar to the frame-level rate control mechanism used for a conventional bit allocation method, except that an adjusted average QP of the previous frame, or the ADJAVGQPPREVFRAME value, is substituted for the conventional AVGPQPREVFRAME value. The ADJAVGQPPREVFRAME value incorporates complexity information from the previous frame according to Equation (1). In particular, the conventional value is adjusted using the average of the minimum SAD values from the previous frame to achieve a more accurate initial value of the quantization parameter, or $QP_{INIT}$, where the SAD values provide an indication of the relative complexity of the previous frame. According to Equation (2), the higher the complexity of the previous frame, the higher the values of MINSAD and QP for the next frame, and thus the greater the number of bits that are allocated for the next frame, and vice versa. The $QP_{INIT}$ value is determined based on the target bit and frame rates along with the complexity information from the previous frame, including the total number of bits spent, average QP value and the average of the minimum SAD values of the previous frame.

The frame-level $QP_{INIT}$ value is then used by a circuit 251 to determine an estimated quantization parameter $QP_{EST}$ at the macroblock level according to the following equation (4):

$$QP_{EST} = QP_{INIT}\left(1 + \frac{12\left(ENCBITSCURFRAME - \left(\frac{mb}{MBPERFRAME}\right)B_T\right)}{TBR}\right) \quad (4)$$

where ENCBITSCURFRAME is provided by the accumulator 209, "mb" is the number of the current frame being encoded relative to MBPERFRAME, MBPERFRAME and TBR are stored at memory locations 225 and 241, respectively, and $B_T$ is the target number of bits per frame, or $B_T$= (TBR/TFR). Equation (4) is similar to the conventional prediction method for MB-level rate control, except that $QP_{INIT}$ is determined using complexity information as described above to provide an improved initial estimate of the quantization parameter.

The rate controller 205 includes a circuit 255 which calculates an adaptive threshold value $M_{THRESHOLD}$ according to the following equation (5):

$$M_{THRESHOLD} = \frac{QUALITY}{10} + TH_{OFFSET} + C1 * \left(\frac{AVGMINSADPREVINT}{1024}\right) + C2 \quad (5)$$

where the QUALITY factor is stored at memory location 229, a threshold offset value $TH_{OFFSET}$ is selected from the values stored at memory location 231 as a function of the TBR and the TFR as described above, C1 and C2 are constants, and AVGMINSADPREVINT is stored at memory location 219. In one embodiment, C1 is equal to 1.4 and C2 is equal to −1, although these values are may be adjusted by experimentation for particular configurations. The AVGMINSADPREVINT value is set to a default value at the beginning of a new frame since a previous interval has not yet been decoded for the new frame. The $M_{THRESHOLD}$ value is used to adjust or "throttle" the $QP_{EST}$ value determined by the rate controller 205 using equation (4) if the $QP_{EST}$ value is too high. A comparator 253 compares $QP_{EST}$ with $M_{THRESHOLD}$ to provide an adjust signal ADJ. If $QP_{EST}$ is greater than $M_{THRESHOLD}$, then the comparator 253 asserts the ADJ signal high. The rate controller 205 includes a circuit 257 which calculates an adaptive quantization parameter $QP_{ADAPT}$ according to the following equation (6):

$$QP_{ADAPT} = M_{THRESHOLD} + LOG_2(QP_{EST} - M_{THRESHOLD}) + \frac{AVGMINSADPREVINT}{WEIGHT} \quad (6)$$

where AVGMINSADPREVINT is stored at memory location 219 and the WEIGHT factor is chosen from the list of WEIGHT factors stored at memory location 233 as a function of TBR as described above. The AVGMINSADPREVINT value is described as the average minimum SAD of the previous interval of the current frame in the illustrated embodiment and as used in Equations (5) and (6). In an alternative embodiment, the AVGMINSADPREVINT value may also be an average minimum SAD of the same interval in the previous frame, and/or a combination thereof $QP_{ADAPT}$ is provided to the logic one (1) input of a multiplexer (MUX) 259, $QP_{EST}$ is provided to the logic zero (0) input of the MUX 259, the ADJ signal is provided to the select (S) input of the MUX 259, and the MUX 259 provides a next quantization parameter $QP_{NEXT}$ at its output. If $QP_{EST}$ is greater than $M_{THRESHOLD}$ so that the ADJ signal is asserted high, then the circuit 257 of the rate controller 205 calculates $QP_{ADAPT}$ as an adjustment of $QP_{EST}$ according to equation (6), and the MUX 259 selects $QP_{ADAPT}$ as $QP_{NEXT}$. Otherwise, if $QP_{EST}$ is not greater than $M_{THRESHOLD}$, then $QP_{EST}$ is asserted as $QP_{NEXT}$.

$QP_{NEXT}$ is provided to the input of an adaptive CAP circuit 261, which outputs QP provided to the video encoder 103. The current (or previous) value of QP is also fed back to another input of the CAP circuit 261, which determines the value of DeltaQP, which is the difference between $QP_{NEXT}$ used for the next interval and the current value of QP used for the previous interval. As previously described, even a relatively small change of QP can lead to a rather large change in the quantization step size $Q_{STEP}$, and a large change in $Q_{STEP}$ leads to a relatively wide disparity in video quality from one frame to the next. The conventional methods for capping or cramping the DeltaQP within a fixed range (e.g., [−2, 2]) often does not work well, especially for a poorly estimated QP. In addition, simple capping of QP within a fixed range tends to result in the value of QP alternating between two fixed values (e.g., QP and QP+2), which significantly degrades picture quality. To solve this problem, the CAP circuit 261 adaptively limits the change of QP from one rate interval to the next, based on the adaptive threshold $M_{THRESHOLD}$ value, to reduce or minimize video quality disparity of successive MBs, intervals, and/or frames. In the illustrated embodiment, if $QP_{NEXT}$ is less than or equal to ($M_{THRESHOLD}$−12), which is the case for simple low motion video or when generating high quality video, the value of DeltaQP is capped within the range of [−1, 1]. This means that QP is limited to a maximum decrease of −1 and a maximum increase of +1. If $QP_{NEXT}$ is less than $M_{THRESHOLD}$ but greater than ($M_{THRESHOLD}$−12), which is the case for medium complexity video, and/or medium motion video, the value of DeltaQP is capped within the range of [−1, 2]. Otherwise, if $QP_{NEXT}$ is greater than or equal to $M_{THRESHOLD}$, which is the case for large motion or low quality video, then the value DeltaQP is capped within the range of [−3, 2].

Figure 3:
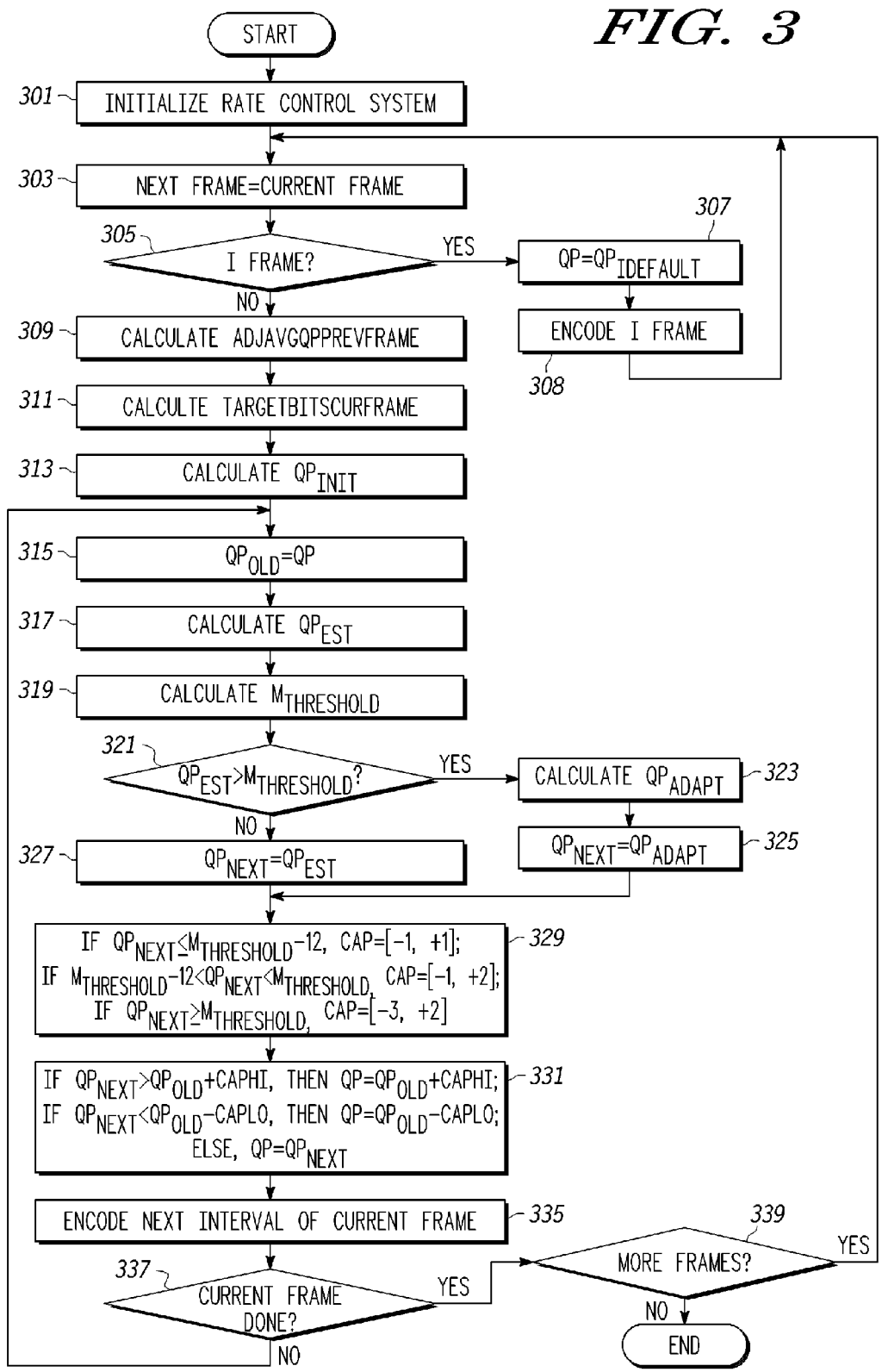
FIG. 3 is a flowchart diagram illustrating operation of the rate control system and the video encoder of FIG. 1 according to an exemplary embodiment of the present invention.

FIG. 3 is a flowchart diagram illustrating operation of the rate control system 107 and the video encoder 103 according to an exemplary embodiment of the present invention. The particular flowchart diagram illustrated is exemplary only and may include fewer or additional blocks or steps in other embodiments. At first block 301, the rate control system 107 is initialized, such as at startup or reset or at the beginning of new video source information. Initialization may include, for example, clearing of the accumulators 201 and variables stored in the memory 203 and/or setting various parameters to initial, default, or predetermined values. For example, the accumulators 207-215 are cleared along with the memory locations 217-223. The memory locations 225-243 are populated with initial or predetermined values as described herein. At next block 303, the "next" frame becomes the "current" frame, which is the first frame of the video source in the first iteration. At next block 305, it is queried whether the current frame is an I frame. The first frame is typically an I frame, so that operation proceeds to block 307 in the first iteration in which QP is initialized to an I frame default value $QP_{IDEFAULT}$. Thus, QP is preset to a default value for I frames and held constant for the entire I frame. It is noted that different bit rates and/or frame rates may have different values of $QP_{IDEFAULT}$, but the selected value is fixed for the entire I frame. At next block 308, the I frame is encoded by the video encoder 103 in its entirety using $QP_{IDEFAULT}$. The accumulators 207 and 209 accumulate the ENCBITSCURINT and ENCBITSCURFRAME values during the encoding process, and the ENCBITSPREVFRAME value is stored at memory location 217 at the conclusion of encoding the first I frame. After the I frame is encoded, operation returns to block 303 to advance to the next frame as the current frame, and then to block 305 to determine whether the next frame is an I frame. The next frame is usually not an I frame, so that operation advances instead to block 309. It is noted that during the video sequence, whenever an I frame is encountered, the steps 305-308 are performed to encode the I frame using the appropriate $QP_{IDEFAULT}$.

At block 309, the ADJAVGQPPREVFRAME value is calculated by the circuit 245 of the rate controller 205 according to Equation (1). In the first iteration, the AVGQPPREVFRAME value is $QP_{IDEFAULT}$ used for the first I frame. Also, for the first iteration, the AVGMINSADPREVFRAME value used in Equation (1) is set equal to a predetermined default or initial value. In one embodiment, the initial default value of AVGMINSADPREVFRAME is 1,500. In an alternative embodiment, the ADJAVGQPPREVFRAME itself is initially set to a predetermined value since otherwise determined by predetermined or initial values in the first iteration. Operation proceeds to next block 311 in which the TARGETBITSCURFRAME value is calculated by the circuit 247 of the rate controller 205 in accordance with Equation (2), using the AVGQPPREVFRAME value determined at block 309. The SCALE factor is stored at memory location 237 and the QPTARGET factor is determined as previously described. At next block 313, $QP_{INIT}$ is calculated by the circuit 249 of the rate controller 205 in accordance with Equation (3) as previously described using the TARGETBITSCURFRAME value calculated at block 311 and the ENCBITSPREVFRAME value stored at memory location 217.

Operation then advances to next block 315, in which a parameter $QP_{OLD}$ is set equal to the current value of QP. $QP_{OLD}$ is used to temporarily store the current value of QP for purposes of comparison with the next value of QP ($QP_{NEXT}$) as described further below. At next block 317, the circuit 251 of the rate controller 205 calculates $QP_{EST}$ in accordance with Equation (4) using $QP_{INIT}$ calculated at block 313. At next block 319, the circuit 255 of the rate controller 205 calculates the $M_{THRESHOLD}$ value in accordance with equation (5). The QUALITY factor and $TH_{OFFSET}$ values are determined as previously described. The AVGMINSADPREVINT value used in Equation (5) is stored at memory location 219; at the beginning of a new frame, however, a default value is used for the AVGMINSADPREVINT value, such as 1,500 as previously described. At next block 321, it is queried whether $QP_{EST}$ is greater than the $M_{THRESHOLD}$ value (e.g., similar function as that performed by the comparator 253). If $QP_{EST}$ is greater than the $M_{THRESHOLD}$ value, then operation proceeds to block 323 in which the circuit 257 of the rate controller 205 calculates $QP_{ADAPT}$ in accordance with equation (6) (e.g., the ADJ signal is asserted). And then at next block 325, $QP_{NEXT}$ is set equal to $QP_{ADAPT}$ since $QP_{ADAPT}$ is used rather than $QP_{EST}$. Alternatively, if $QP_{EST}$ is not greater than the $M_{THRESHOLD}$ value as determined at block 321, then operation instead proceeds to block 327 in which $QP_{NEXT}$ is set equal to $QP_{EST}$ and $QP_{ADAPT}$ is not calculated nor used.

After either block 325 or 327, operation proceeds to block 329 for determining the appropriate CAP range to be applied to $QP_{NEXT}$ for limiting DeltaQP or the amount of change of QP from one interval to the next (as performed by the CAP circuit 261). If $QP_{NEXT}$ is less than or equal to $M_{THRESHOLD}$–12 (low values), then the CAP range is [−1, +1]; if $QP_{NEXT}$ is greater than $M_{THRESHOLD}$–12 but less than $M_{THRESHOLD}$ (medium values), then the CAP range is [−1, +2]; and if $QP_{NEXT}$ is greater than or equal to $M_{THRESHOLD}$ (large values), then the CAP range is [−3, +2]. In the illustrated embodiment, the first, negative value corresponds to a CAPLO value which limits the amount of decrease of QP and the second, positive value corresponds to a CAPHI value which limits the amount of increase of QP. At next block 331, the CAP function is applied using the selected CAP range determined at block 329. In particular, if $QP_{NEXT}$ is greater than $QP_{OLD}$+CAPHI, then $QP=QP_{OLD}$+CAPHI thereby limiting the increase of QP to CAPHI. If $QP_{NEXT}$ is less than $QP_{OLD}$–CAPLO, then $QP=QP_{OLD}$–CAPLO thereby limiting the decrease of QP to CAPLO. Otherwise, $QP=QP_{NEXT}$.

After block 331, operation proceeds to block 335 in which the next interval of the current frame is encoded by the video encoder 103. Operation then proceeds to block 337 to determine whether encoding of the current frame is done. If the current frame is not fully encoded, then operation returns back to block 315 to temporarily store the current value of QP as previously described. Blocks 315-337 are repeated for the encoding of each interval of the current frame (other than an I frame). When the current frame is completed as determined at block 337, operation proceeds to block 339 in which it is queried whether there are more frames of the video source to encode. If not, operation is completed. Otherwise, operation proceeds back to block 303 to advance to the next frame.

Figure 4:
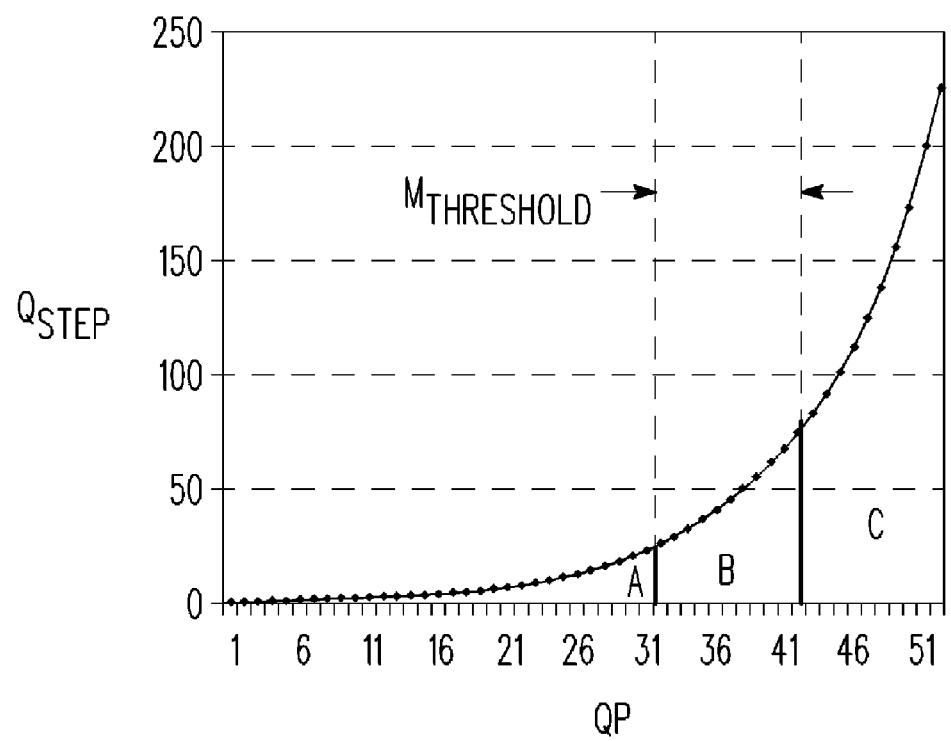
FIG. 4 is a graphic diagram plotting the "QP curve" between the quantization step size $Q_{STEP}$ versus QP for the H.264 standard, where the QP curve is further partitioned into multiple segments according to an exemplary embodiment of the present invention.

FIG. 4 is a graphic diagram plotting the "QP curve" between the quantization step size $Q_{STEP}$ versus QP for the H.264 standard, where the QP curve is further partitioned into multiple segments according to an exemplary embodiment of the present invention. The step size $Q_{STEP}$ is plotted along the vertical (or Y) axis and QP is plotted along the horizontal (or X) axis. QP is constrained between 0 and 51 and the step size $Q_{STEP}$ ranges between 0.625 and 226 as illustrated. The logarithmic relationship between $Q_{STEP}$ and QP for video encoders implemented according to H.264 is according to the following equation (7):

$$Q_{STEP}=0.625*(2^{QP/6}) \quad (7)$$

As illustrated in FIG. 4, the QP curve is partitioned into three separate sections labeled A, B and C. The A partition includes the QP values from 0 to 31 and represents relatively small QP values having almost a linear relationship between $Q_{STEP}$ and QP. The A partition represents video content with relatively simple content and/or relatively low amount of motion which is treated using an adjustment similar to the conventional linear prediction method. As described above, however, the conventional linear method is modified based on complexity information of the prior frame. The B partition corresponds to QP values from 32 to 42 and represents a "turn around" area of the QP curve. The $M_{THRESHOLD}$ value is mathematically constrained to stay within the B partition range and is based on the complexity of the previously encoded intervals in the current frame. The C partition includes QP values greater than 42, in which a relatively small change in the QP value from one interval to the next (deltaQP) result in a relatively large change of $Q_{STEP}$ and is carefully treated as described herein. When $QP_{EST}$ is less than or equal to the calculated $M_{THRESHOLD}$ value (updated after each interval), then it falls within the A partition or within the lower portion of the B partition and is not further adjusted and is used as the next value of QP. When $QP_{EST}$ is greater than the $M_{THRESHOLD}$ value, then $QP_{ADAPT}$ is determined, based on $QP_{EST}$, and used instead. The change of the QP is further adaptively capped based on the $M_{THRESHOLD}$ regardless of the applicable partition in the illustrated embodiment.

It is further noted that the encoding mode decision made by the video encoder 103 largely relies upon QP. Each MB is encoded in 'intraframe' mode in which a prediction MB is formed based on reconstructed MBs in the current frame, or 'interframe' mode in which a prediction MB is formed based on the MBs of the reference frames. The intraframe encoding mode applies spatial information within the current frame in which the prediction MB is formed from samples in the current frame. The interframe encoding mode utilizes temporal information from previous and/or future reference frames to estimate motion to form the prediction MB. In either case, a reference frame is used which has previously been encoded, decoded and reconstructed. A small change in QP may cause different mode decision result. The use of the $M_{THRESHOLD}$ value in accordance with embodiments of the present invention significantly enhances the accuracy of QP from one interval to the next, which further improves the mode decisions made by the video encoder 103.

A rate controller which adaptively adjusts a quantization parameter (QP) to control a bit rate of a video encoder according to an embodiment of the present invention includes first, second and third circuits, a comparator, and select logic. The first circuit calculates an estimated QP based on encoding bit rate information of a current frame and first complexity information of a previous frame. The second circuit calculates a threshold value based on a video quality factor, a target bit rate and second complexity information of a previous interval of the current frame. The comparator asserts an adjust signal if the estimated QP is greater than the threshold value. The third circuit calculates an adaptive QP when the adjust signal is asserted, where the adaptive QP is based on the estimated QP and the threshold value. The select logic provides the adaptive QP as a next QP when the adjust signal is asserted and otherwise provides the estimated QP as the next QP.

The rate controller may further include an adaptive cap circuit which adaptively limits a change of the next QP based on a difference between the next QP and the threshold value. The second circuit may be implemented to calculate the threshold value using a target frame rate and using an average of minimum sum of absolute difference values of the previous interval as the second complexity information. The third circuit may be implemented to calculate the adaptive QP using the target frame rate and using an average of minimum sum of absolute difference values of the previous interval.

The rate controller may include a fourth circuit which calculates an initial QP for the current frame using the first complexity information and encoding information of the previous frame. In this case, the first circuit updates the estimated QP after a current interval of the current frame is encoded using the initial QP and encoding bit rate information of the current interval of the current frame. The fourth circuit may use an average QP used for the previous frame as the first complexity information. The fourth circuit may further use an average of minimum sum of average difference values of the previous frame as the first complexity information.

The rate controller may further include a fifth circuit which calculates an adjusted average QP for the previous frame based on an average QP used for the previous frame and an average of minimum sum of average difference values used for encoding the previous frame. The rate controller may further include a sixth circuit which calculates a target number of bits for encoding the current frame using the target bit rate, the target frame rate, the adjusted average QP for the previous frame and a target QP. In this case, the fourth circuit may be implemented to calculate the initial QP using the average QP used for the previous frame, a number of bits used for encoding the previous frame and the target number of bits for encoding the current frame.

A video system for proving real-time video communications according to an embodiment of the present invention includes a video encoder and a rate control system. The video encoder converts video data into compressed video information at a bit rate based on a next QP and provides encoding bit rate information and video complexity information. The rate control system includes accumulation logic and a rate controller, such as according to that described above. The accumulation logic accumulates the encoding bit rate information and the video complexity information. The video system may include a cap circuit which adaptively limits a change of the next QP based on a difference between the next QP and the threshold value.

The video encoder of the video system may provide the video complexity information as a minimum sum of absolute difference value after encoding each macroblock of the video data. In this case, the accumulation logic may include a first accumulator which accumulates each minimum sum of absolute difference (SAD) value for each interval of each frame for providing a sum of minimum SAD values for the each interval, a second accumulator which accumulates the sum of minimum SAD values for the each interval for providing a sum of minimum SAD values for each frame, a first memory location for storing an average minimum SAD value for the each interval, and a second memory location for storing an average minimum SAD value for the each frame.

The video encoder of the video system may provide the encoding bit rate information as a number of bits for encoding each macroblock of the video data. In this case, the accumulation logic may include a first accumulator which accumulates each number of bits for encoding each macroblock for each interval of each frame for providing a number of bits for encoding the each interval, a second accumulator which accumulates the number of bits for encoding the each interval for providing a number of bits for encoding each frame, and a memory location for storing a number of bits for encoding the previous frame.

A method of adaptively adjusting a QP of a video encoder to control output bit rate according to an embodiment of the present invention includes estimating the QP based on a complexity of a previous frame and encoding bit rate information of a current frame to provide an estimated QP, determining a threshold value based on a video quality factor, a target bit rate and a complexity of a previous interval of the current frame, or of the same interval in the previous frame, or a combination thereof, and if the estimated QP is greater than the threshold value, adaptively adjusting the estimated QP based on the threshold value.

The method may include adaptively limiting a change of the QP between intervals based on a difference between the QP and the threshold value. The method may include calculating the threshold value using a target frame rate and using an average of minimum sum of absolute difference values of the previous interval of the current frame (or the same interval of the previously encoded frame). The method may include adaptively adjusting the estimated QP using an average of minimum sum of absolute difference values of the previous interval of the current frame (or the same interval of the previously encoded frame) as the complexity of the previous interval of the current frame. The method may include determining an initial QP for the current frame based on the complexity of the previous frame and encoding information of the previous frame, and adjusting the estimated QP after a current interval of the current frame is encoded based on the initial QP and encoding information of the current interval of the current frame. The method may include using an average QP of the previous frame as the complexity of the previous frame. The method may include using an average of minimum sum of absolute difference values of the previous frame as the complexity of the previous frame.

The method may also include determining an adjusted average QP for the previous frame using an average QP used for the previous frame and an average of minimum sum of absolute difference values of the previous frame, determining a target number of bits for encoding the current frame using the target bit rate, the target frame rate, the adjusted average QP for the previous frame and a target QP, and using the average QP used for the previous frame, a number of bits used for encoding the previous frame, and the target number of bits for encoding the current frame Although the present invention has been described in considerable detail with reference to certain preferred versions thereof, other versions and variations are possible and contemplated. For example, the video encoder system 100 may be implemented in any of many different configurations, such as on a chip, using discrete logic, as a CODEC implemented in software or firmware of a processor system, etc. The discrete blocks or circuitry may be implemented in software. Particular predefined constants, factors or variables, such as the $TH_{OFFSET}$ values, the QUALITY factor, the DELAY factor, the WEIGHT factors, the SCALE factor, the CAP ranges, etc., are described for a particular implementation and may be adjusted or made programmable to achieve optimal results for a given configuration. Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

What is claimed is:

1. A rate controller which adaptively adjusts a quantization parameter (QP) to control a bit rate of a video encoder, said rate controller comprising:
    a first circuit which calculates an estimated QP based on encoding bit rate information of a current frame and first complexity information of a previous frame;
    a second circuit which calculates a threshold value based on a video quality factor, a target bit rate and second complexity information of a previous interval of said current frame or of said previous frame;
    a comparator which asserts an adjust signal if said estimated QP is greater than said threshold value;
    a third circuit which calculates an adaptive QP when said adjust signal is asserted, wherein said adaptive QP is based on said estimated QP and said threshold value; and
    select logic which provides said adaptive QP as a next QP when said adjust signal is asserted and which otherwise provides said estimated QP as said next QP.

2. The rate controller of claim 1, further comprising an adaptive cap circuit which adaptively limits a change of said next QP based on a difference between said next QP and said threshold value.

3. The rate controller of claim 1, wherein said second circuit calculates said threshold value using a target frame rate and using an average of minimum sum of absolute difference values of said previous interval as said second complexity information.

4. The rate controller of claim 1, wherein said third circuit calculates said adaptive QP using a target frame rate and an average of minimum sum of absolute difference values of said previous interval.

5. The rate controller of claim 1, further comprising:
a fourth circuit which calculates an initial QP for said current frame using said first complexity information and encoding information of said previous frame; and
wherein said first circuit updates said estimated QP after a current interval of said current frame is encoded using said initial QP and encoding bit rate information of said current interval of said current frame.

6. The rate controller of claim 5, wherein said fourth circuit uses an average QP used for said previous frame as said first complexity information.

7. The rate controller of claim 6, wherein said fourth circuit further uses an average of minimum sum of average difference values of said previous frame as said first complexity information.

8. The rate controller of claim 5, further comprising:
a fifth circuit which calculates an adjusted average QP for said previous frame based on an average QP used for said previous frame and an average of minimum sum of average difference values used for encoding said previous frame;
a sixth circuit which calculates a target number of bits for encoding said current frame using said target bit rate, a target frame rate, said adjusted average QP for said previous frame and a target QP; and
wherein said fourth circuit calculates said initial QP using said average QP used for said previous frame, a number of bits used for encoding said previous frame and said target number of bits for encoding said current frame.

9. A video system for providing real-time video communications, comprising:
a video encoder which converts video data into compressed video information at a bit rate based on a next quantization parameter (QP), said video encoder providing encoding bit rate information and video complexity information; and
a rate control system, comprising:
accumulation logic which accumulates said encoding bit rate information and said video complexity information; and
a rate controller, comprising:
a first circuit which calculates an estimated QP based on said encoding bit rate information of a current frame and said video complexity information of a previous frame;
a second circuit which calculates a threshold value based on a video quality factor, a target bit rate, a target frame rate and said video complexity information of a previous interval of said current frame or of said previous frame;
a comparator which asserts an adjust signal if said estimated QP is greater than said threshold value;
a third circuit which calculates an adaptive QP when said adjust signal is asserted, wherein said adaptive QP is based on said estimated QP, said threshold value, said target bit rate, and said video complexity information of a previous interval of said current frame or of said previous frame; and
select logic which provides said adaptive QP as a next QP when said adjust signal is asserted and which otherwise provides said estimated QP as said next QP.

10. The video system of claim 9, wherein said rate controller further comprises a cap circuit which adaptively limits a change of said next QP based on a difference between said next QP and said threshold value.

11. The video system of claim 9, wherein:
said video encoder provides said video complexity information as a minimum sum of absolute difference value after encoding each macroblock of said video data; and
wherein said accumulation logic comprises:
a first accumulator which accumulates each minimum sum of absolute difference (SAD) value for each interval of each frame for providing a sum of minimum SAD values for said each interval;
a second accumulator which accumulates said sum of minimum SAD values for said each interval for providing a sum of minimum SAD values for each frame;
a first memory location for storing an average minimum SAD value for said each interval; and
a second memory location for storing an average minimum SAD value for said each frame.

12. The video system of claim 9, wherein:
said video encoder provides said encoding bit rate information as a number of bits for encoding each macroblock of said video data; and
wherein said accumulation logic comprises:
a first accumulator which accumulates each number of bits for encoding each macroblock for each interval of each frame for providing a number of bits for encoding said each interval;
a second accumulator which accumulates said number of bits for encoding said each interval for providing a number of bits for encoding each frame; and
a memory location for storing a number of bits for encoding said previous frame.

13. A method of adaptively adjusting a quantization parameter (QP) of a video encoder to control output bit rate, comprising:
estimating the QP based on a complexity of a previous frame and encoding bit rate information of a current frame to provide an estimated QP;
determining a threshold value based on a video quality factor, a target bit rate and a complexity of a previous interval of the current frame or of the previous frame; and
if the estimated QP is greater than the threshold value, adaptively adjusting the estimated QP based on the threshold value.

14. The method of claim 13, further comprising adaptively limiting a change of the QP between frame intervals based on a difference between the QP and the threshold value.

15. The method of claim 13, wherein said determining a threshold value comprises calculating the threshold value using a target frame rate and using an average of minimum sum of absolute difference values of the previous interval of the current frame as the complexity of the previous interval.

16. The method of claim 13, wherein said adaptively adjusting the estimated QP comprises adaptively adjusting the estimated QP using a target frame rate and an average of minimum sum of absolute difference values of the previous interval.

17. The method of claim 13, wherein said estimating the QP comprises:

for the current frame, determining an initial QP based on the complexity of the previous frame and encoding information of the previous frame; and after a current interval of the current frame is encoded, adjusting the estimated QP based on the initial QP and encoding information of the current interval of the current frame.

18. The method of claim 17, wherein said determining the initial QP comprises using an average QP of the previous frame as the complexity of the previous frame.

19. The method of claim 18, wherein said determining the initial QP further comprises using an average of minimum sum of absolute difference values of the previous frame as the complexity of the previous frame.

20. The method of claim 17, further comprising:

determining an adjusted average QP for the previous frame using an average QP used for the previous frame and an average of minimum sum of absolute difference values of the previous frame;

determining a target number of bits for encoding the current frame using the target bit rate, a target frame rate, the adjusted average QP for the previous frame and a target QP; and wherein said determining an initial QP comprises using the average QP used for the previous frame, a number of bits used for encoding the previous frame, and the target number of bits for encoding the current frame.

* * * * *